United States Patent
Gaikwad et al.

(10) Patent No.: US 9,792,837 B2
(45) Date of Patent: Oct. 17, 2017

(54) LABELS AND TAGS FOR HIGH TEMPERATURE APPLICATIONS

(71) Applicant: Avery Dennison Corporation, Glendale, CA (US)

(72) Inventors: Anil Vilas Gaikwad, Willoughby, OH (US); Ronald Wiegers, 's-Hertogenbosch (NL); Denis Markov, Amsterdam (NL); Chee Hoong Lai, Alphen aan den Rijn (NL); Martin Burianek, Plzen (CZ)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 15/152,884

(22) Filed: May 12, 2016

(65) Prior Publication Data

US 2016/0335926 A1 Nov. 17, 2016

Related U.S. Application Data

(60) Provisional application No. 62/161,172, filed on May 13, 2015.

(51) Int. Cl.
*C09D 183/02* (2006.01)
*C09D 183/04* (2006.01)
(Continued)

(52) U.S. Cl.
CPC ............. *G09F 3/02* (2013.01); *C09D 183/02* (2013.01); *C09D 183/04* (2013.01);
(Continued)

(58) Field of Classification Search
CPC ...... B41M 5/52; B41M 5/5218; B41M 5/529; C09D 183/02; C09D 183/04; G09F 3/00;
(Continued)

(56) References Cited

U.S. PATENT DOCUMENTS

| 4,526,912 A | 7/1985 | Biorcio et al. |
| 4,578,312 A | 3/1986 | Biorcio et al. |

(Continued)

FOREIGN PATENT DOCUMENTS

| EP | 0217129 | 4/1987 |
| JP | 5-9437 | 1/1993 |

(Continued)

OTHER PUBLICATIONS

Miller, "A Model for the Prediction of Thermo-oxidative Mass Loss of Ceramic Coated Polyimide Composites," Mar. 1995, 166 pages.

(Continued)

*Primary Examiner* — Bruce H Hess
(74) *Attorney, Agent, or Firm* — Avery Dennison Corporation

(57) ABSTRACT

Various tags and adhesive labels are described which can be used in high temperature environments such as up to 1,000° C. The tags and labels include a substrate having one or more high temperature printable coatings. The labels can also include pressure sensitive adhesives and optional release liners.

32 Claims, 3 Drawing Sheets

(51) Int. Cl.
- *G09F 3/00* (2006.01)
- *G09F 3/02* (2006.01)
- *C09J 7/02* (2006.01)
- *G09F 3/10* (2006.01)

(52) U.S. Cl.
CPC .............. *C09J 7/0292* (2013.01); *G09F 3/10* (2013.01); *G09F 2003/0211* (2013.01); *G09F 2003/0241* (2013.01); *Y10T 428/24893* (2015.01); *Y10T 428/24909* (2015.01); *Y10T 428/31663* (2015.04)

(58) Field of Classification Search
CPC ..... G09F 2003/0211; Y10T 428/24893; Y10T 428/24909; Y10T 428/31663
USPC ......... 428/32.34, 32.5, 195.1, 206, 208, 447
See application file for complete search history.

(56) References Cited

U.S. PATENT DOCUMENTS

| | | | |
|---|---|---|---|
| 5,422,167 A * | 6/1995 | Robertson | G09F 3/02 428/195.1 |
| 5,484,099 A | 1/1996 | Robertson et al. | |
| 5,506,016 A | 4/1996 | Onodera et al. | |
| 5,576,110 A | 11/1996 | Lin et al. | |
| 5,773,112 A | 6/1998 | Tachikawa et al. | |
| 6,074,747 A | 6/2000 | Scholz et al. | |
| 6,261,730 B1 | 7/2001 | Yanus et al. | |
| 6,582,805 B1 | 6/2003 | Moh et al. | |
| 2004/0038025 A1 | 2/2004 | Matsumi et al. | |
| 2006/0068172 A1 | 3/2006 | Yang | |
| 2006/0269721 A1 | 11/2006 | Finkel et al. | |
| 2007/0027241 A1 | 2/2007 | Akamatsu | |
| 2015/0053339 A1 * | 2/2015 | Ducharme | B65C 1/02 156/247 |

FOREIGN PATENT DOCUMENTS

| | | |
|---|---|---|
| JP | 9-26751 | 1/1997 |
| WO | 93/07844 | 4/1993 |
| WO | 99/36901 | 7/1999 |

OTHER PUBLICATIONS

McDonald et al,, "Recent Developments in Soluble Silicate Based Binders and Coatings," at least as early as May 5, 2014, 10 pages.

Technical Data Sheet, Graphiplast (R) 7947.50my PA-130-201 PT-50-S, at least as early as May 5, 2014, 2 pages.

Technical Data Sheet, Graphiplast (R) 7377.180, at least as early as May 5, 2014, 2 pages.

Heatproof Series, Extreme Heat Resistant Barcoded Labels and Plates, at least as early as May 5, 2014, 2 pages, http://www.madicographicfilms.com/dl/pdf/Heatproof_2pp_A4.pdf.

Yang, "A Heat Resistant Label Material and its Application in High Temperature Processing," Brady Corporation, XXI International Enamellers Congress, Shanghai, China, May 18-22, 2008, pp. 317-321.

International Search Report and Written Opinion dated Jul. 13, 2016 issued in corresponding International Application No. PCT/US2016/032024 filed May 12, 2016.

* cited by examiner

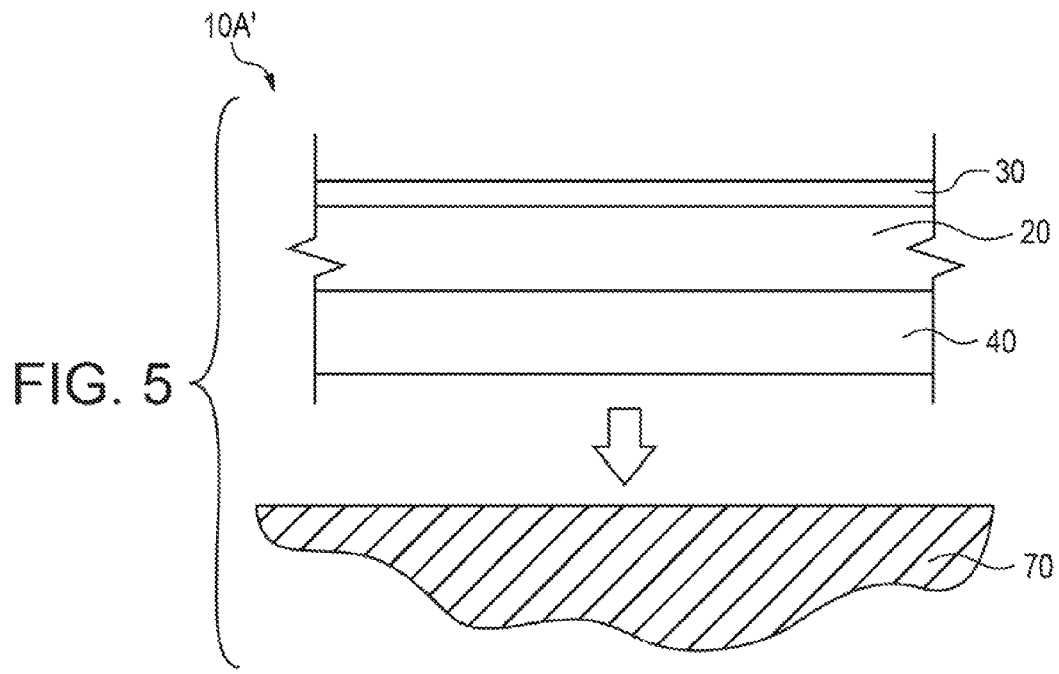
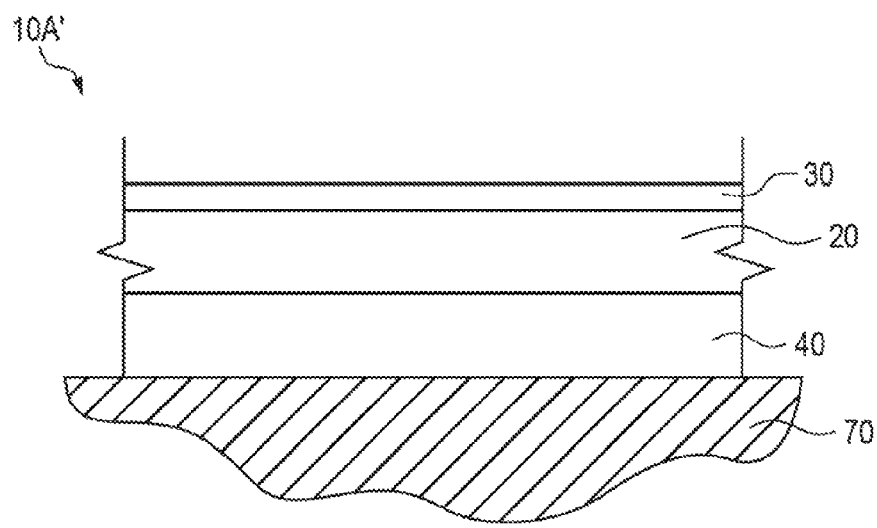
FIG. 6

LABELS AND TAGS FOR HIGH TEMPERATURE APPLICATIONS

CROSS REFERENCES TO RELATED APPLICATION

The present application claims the benefit of U.S. Provisional Patent Application No. 62/161,172 filed May 13, 2015, which is incorporated herein by reference in its entirety.

FIELD

The present subject matter relates to tags and adhesive labels that can be used in high temperature applications.

BACKGROUND

Applications exist in which labels or tags are applied to components or other surfaces which may be at an elevated temperature, such as from 200° C. to 1,000° C. Examples of such applications exist in industries such as steel and aluminium processing, mining, automobile manufacturing, and chemical industries. The labels or tags are typically applied to provide identification or associate information with the component or surface of interest. If the component or surface is at an elevated temperature, it may be undesirable to cool the component or wait until the component has reached a lower temperature prior to applying the label or tag. Hence, many labelling operations occur directly upon a component having a relatively high temperature. In addition, if labelling occurs at ambient temperature, a labelled component may subsequently be exposed to relatively high temperatures.

However, a problem of many currently known labels or tags is that upon exposure to elevated temperatures, the label or tag degrades. Such degradation may include reduction in various adhesive properties such that the label or tag becomes detached. Such degradation can also involve loss of print integrity or bond between ink or marking material and a face of the label or tag. Therefore, in either application of labels/tags to high temperature surfaces or subsequent heating of applied labels/tags, it would be beneficial to provide a label or tag that was printable and could be adhered to a component or surface that was at an elevated temperature and/or once adhered, could be subjected to elevated temperatures without degradation of the label, tag, or print or other markings thereon.

SUMMARY

The difficulties and drawbacks associated with previous approaches are addressed in the present subject matter as follows.

In one aspect, the present subject matter provides a printable tag for high temperature applications. The tag comprises a coated substrate defining at least one print receptive face. The coated substrate has a high temperature printable coating that constitutes the print receptive face. The coating is selected from the group consisting of (i) a coating including pigment dispersed in a siloxane binder, and (ii) a coating including pigment dispersed in an inorganic silicate based binder.

In another aspect, the present subject matter provides a printable adhesive label for high temperature applications. The label comprises a substrate defining a first face and an oppositely directed second face. The label also comprises pressure sensitive adhesive disposed on the second face of the substrate. And, the label additionally comprises a high temperature printable coating disposed on the first face of the substrate. The coating is selected from the group consisting of (i) a coating including pigment dispersed in a siloxane binder, and (ii) a coating including pigment dispersed in an inorganic silicate based binder.

In another aspect, the present subject matter provides a method of labeling a surface having a temperature within a range of from 200° C. to 1,000° C. The method comprises providing a label including (i) a substrate defining a first face and an oppositely directed second face, (ii) pressure sensitive adhesive disposed on the second face of the substrate, and (iii) a high temperature printable coating disposed on the first face of the substrate. The coating is selected from the group consisting of a coating including pigment dispersed in a siloxane binder, and a coating including pigment dispersed in an inorganic silicate based binder. The method also comprises applying the label to a surface having a temperature within a range of from 200° C. to 1,000.

In yet another aspect, the present subject matter provides a method of providing identification of a component subjected to a temperature up to 1,000° C. The method comprises providing an adhesive label including (i) a substrate defining a first face and an oppositely directed second face, (ii) pressure sensitive adhesive disposed on the second face of the substrate, and (iii) a high temperature printable coating disposed on the first face of the substrate. The coating is selected from the group consisting of a coating including pigment dispersed in a siloxane binder, and a coating including pigment dispersed in an inorganic silicate based binder. The method also comprises printing identification indicia on the coating. And, the method also comprises contacting the pressure sensitive adhesive with the component.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

FIG. 5 is a schematic illustration depicting adhering the label assembly of FIG. 1 to a substrate in accordance with the present subject matter.

FIG. 6 is a schematic illustration showing the label assembly of FIG. 1 adhered to the substrate in FIG. 5.

DETAILED DESCRIPTION OF THE EMBODIMENTS

Figure 1:
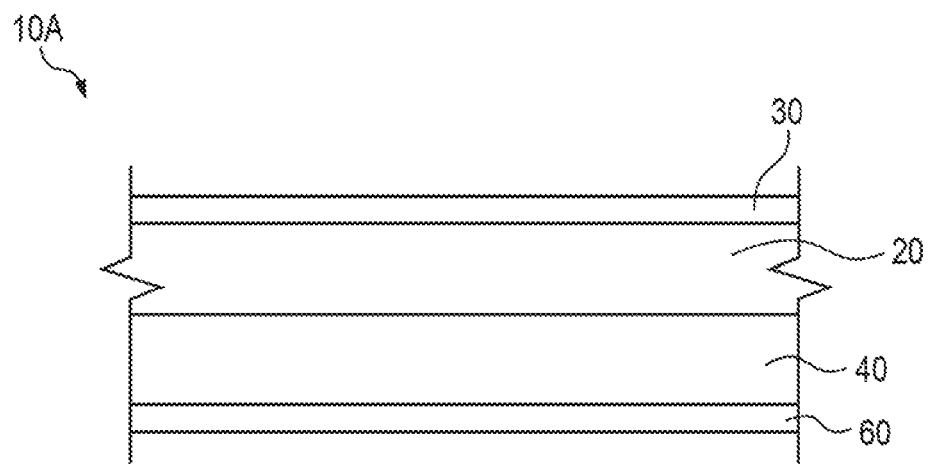
FIG. 1 is a schematic cross sectional illustration of an embodiment of a label assembly in accordance with the present subject matter.

The present subject matter provides various printable labels and printable tags for high temperature applications, for example from about 200° C. to about 1,000° C. The tags include a coated substrate with at least one print receptive face. The coated substrate has a high temperature printable coating that constitutes the print receptive face. The coating includes pigment dispersed in either a siloxane binder or an inorganic silicate based binder. As described in greater detail herein, the coating having the siloxane binder is used in environments or applied to substrates having a temperature within a range from about 200° C. to about 500° C.; and the coating having the inorganic silicate based binder is used in environments or applied to substrates having a temperature within a range from about 500° C. to about 1,000° C.

The printable labels include a substrate with a first face and an oppositely directed second face. The labels also include a pressure sensitive adhesive disposed on the second face of the substrate. And, the labels additionally include a high temperature printable coating disposed on the first face of the substrate. The coating is as previously described with regard to the printable tag. The labels may also include one or more release liners that cover, partially or entirely, the adhesive. In addition, the tags and labels can also include one or more layers or regions of a top coat.

Details and additional aspects of the present subject matter are as follows.

Substrates

The substrates used in the tags and labels of the present subject matter include various polymeric films, metals or metallic foils, and composites thereof. The substrates can also include silane or ceramic coated fiber cloth material(s). Generally, the substrates include one or more layers, are relatively thin, and have a total thickness of from about 20 to about 500 microns, or more.

One or more layers of the substrate can be a polymeric film such as a polyimide. Typical thicknesses for a polyimide layer are from 50 to 200 microns.

One or more layers of the substrate can be a metallic foil such as aluminum and/or an aluminum alloy material having a thickness of from 50 to 150 microns.

One or more layers of the substrate can be stainless steel and/or alloyed steel foil having a thickness of from 20 to 400 microns.

The substrate can include combinations of polymeric materials, combinations of metals and/or metal materials, coated cloth materials, and can also include composite materials of polymers, coated cloth materials, and/or metals. The term "cloth materials" as used herein refers to fibrous woven and nonwoven materials formed from fibrous materials that can withstand temperatures of up to 1,000° C. A nonlimiting example of a cloth material is a woven or nonwoven material formed from glass fibers. In certain embodiments the fibers can be coated with one or more other materials.

The substrate can be in the form of a single layer. Alternatively, a multilayer substrate can be used in which the substrate includes two or more layers and typically from two to four layers.

Coatings

The coatings used in the tags and labels of the present subject matter are printable and are resistant to temperatures within a range of from 200° C. to 1,000° C. or higher in certain embodiments. Generally, two classes of coatings are provided, each adapted for use in a particular temperature range.

A first class of coatings can be used in environments or applied to substrates having a temperature within a range of from 200° C. to 500° C. This first class of coatings comprises one or more pigments dispersed in a siloxane binder. The first class of coatings can be applied to a single face or region of the substrate or be applied to all faces or regions of the substrate. The thickness of the first class of coatings is typically within a range of from 10 microns to 30 microns.

In a particular embodiment, the first class of coatings is a solvent-based coating with a solids content within a range of 40% to 60% by weight. The weight ratio of pigment to binder is within a range of from 4:1 to 3:1. Nonlimiting examples of pigments include $TiO_2$, $SiO_2$, $CaCO_3$, and combinations thereof. Typical coating thicknesses are 15 microns to 30 microns.

The first class of coatings may include one or more dispersing agents which for example can be a polyester-based dispersing agent.

A nonlimiting example of a coating that corresponds to the first class of coatings is a coating comprising one or more pigments in a methyl phenyl siloxane dispersion in water. Representative amounts of pigment can range from about 15% to about 35%, with 20% to 30% being typical for many applications. Nonlimiting amounts of the siloxane dispersion in water can range from about 40% to about 80%, with 50% to 70% being typical. It will be appreciated that the present subject matter is not limited to these particular proportions, and instead includes amounts less than and/or greater than these representative amounts.

A second class of coatings can be used in environments or applied to substrates having a temperature within a range of from 500° to 1,000° C. This second class of coatings comprises one or more pigments dispersed in an inorganic silicate based binder. In certain embodiments, the binder is a silicate/phosphate binder. The second class of coatings can be applied to a single face or region of the substrate or be applied to all faces or regions of the substrate. The thickness of the second class of coatings is typically within a range of from 10 microns to 30 microns.

In a particular embodiment, the second class of coatings includes one or more pigments such as silica, clay, $CaCO_3$, and combinations thereof. Typical coating thicknesses are from 15 microns to 30 microns.

Generally, these coatings can resist the noted temperatures for a time period of up to 30 minutes of continuous exposure without degradation of the coating, its components, its anchorage to an underlying surface, and/or loss of indicia or marking material applied on the coating.

The various coatings can also include one or more additional components and/or ancillary ingredients including but not limited to wetting and dispersing additives, fumed silica, mica particulates, crosslinking agents, and other agents.

Adhesive

The labels of the present subject matter may comprise one or more layers or regions of adhesive disposed on a substrate and/or coated substrate. The adhesives are typically pressure sensitive adhesives such as for example solvent-based acrylate adhesives, UV acrylate hotmelt adhesives, and silicone adhesives.

The solvent-based acrylic adhesive may be any pressure sensitive adhesive that is capable of adhering to the coated substrate.

Useful acrylate copolymers may or may not be self-crosslinking and are formed from at least two monomers chosen from: (1) hydroxyalkyl esters of acrylic or methacrylic acid in which the alkyl group comprises 2 to 4 carbon atoms, such as 2-hydroxyethyl acrylate, 2-hydroxyethyl methacrylate, 2-hydroxypropyl acrylate and 2-hydroxypropyl methacrylate; (2) alkyl esters of acrylic or methacrylic acid in which the alkyl group of the ester comprises 4 to 18 carbon atoms, such as n-butyl acrylate or methacrylate, isopropyl acrylate or methacrylate, n-hexyl methacrylate and 2-ethylhexyl acrylate; (3) α,β-unsaturated monocarboxylic or dicarboxylic acids, their anhydrides and their alkyl or alkenyl esters in which the alkyl group contains from 1 to 3 carbon atoms and the alkenyl group contains from 2 to 5 carbon atoms, such as acrylic acid, itaconic acid, maleic acid, maleic anhydride, alkyl methacrylate and the diethyl esters of fumaric or maleic acid; (4) vinyl monomers, such as vinyl acetate, acrylonitrile, vinyl propionate, vinylpyrrolidone and styrene; (5) monomers containing a functional group selected from amido, amino and epoxy groups, for example, acrylamide, N-butylacrylamide, alkylaminoalkyl and aminoalkyl derivatives of acrylic or methacrylic acid, such as amino-ethyl acrylate, aminoethyl methacrylate and 2-(dimethylamino) ethyl methacrylate, glycidyl methacrylate and glycidyl acrylate; (6) alkoxyalkyl esters of acrylic or methacrylic acid, for example methoxyethyl acrylates or methacrylates, butoxyethyl acrylates or methacrylates, methoxypropylene glycol acrylates or methacrylates and methoxypolyethylene glycol acrylates or methacrylates; and (7) hexamethylene glycol dimethacrylate.

As these copolymers can be self-crosslinking, they may also contain a crosslinking agent selected from those generally used by those skilled in the art, for example, organic peroxides, polyisocyanates, chelates or metals such as titanium or aluminum, or metal acetylacetonates, such as those of zinc, magnesium and aluminum.

These adhesive acrylate copolymers may take the form of solutions in a solvent system consisting of a single organic solvent or a mixture of several solvents, which contain about 25% to about 55% by weight copolymers. Examples of suitable solvents include aromatic solvents such as toluene, xylene, etc. Suitable aliphatic solvents include esters such as ethyl acetate, propyl acetate, isopropyl acetate, butyl acetate, etc.; ketones such as methyl ethyl ketone, acetone, etc.; aliphatic hydrocarbons such as heptanes, hexane, pentane, etc.

The UV or radiation curable acrylate hotmelt adhesives generally include an acrylic polymer backbone molecule that is modified with polymerized photoreactive groups, e.g., a modified benzophenone group that is chemically bonded to the acrylic polymer chain. The polymer is crosslinked by chemical grafting caused by the excitation of the photoinitiator by UV irradiation. The bound photoinitiator will typically be present in amounts of from about 0.1 to about 5 wt %, based on the weight of the acrylic polymer.

In certain embodiments, the UV acrylic copolymers comprise a C4 to C8 alkyl acrylate and has bonded to it a pendant benzophenone group. These materials are solvent- and water-free acrylic raw materials. These polymers are highly viscous liquids at room temperature and have to be heated to a temperature of about 120-130° C. to become fluid enough (viscosity ca. 40 Pa s) for the coating process on paper or plastic carriers. At this temperature, they can be applied to a backing substrate or carrier with conventional hot melt coating systems. Thus they are processed as hot melts. After being coated on the carrier, the polymer film is crosslinked by UV-irradiation to produce the adhesive properties required.

In particular embodiments, the UV acrylic copolymer comprises 2-ethylhexyl acrylate that has bonded to it a pendant benzophenone group.

Examples of photoinitiators which may be used include one or more of the following: benzophenone, benzyldimethyl ketal, isopropylthioxanthone, bis(2,6-dimethoxybenzoyl)(2,4,4-trimethylpentyl) phosphineoxide, 2-hydroxy-2-methyl-1-phenyl-1-propanone, diphenyl(2,4,6-trimethylbenzoyl)phosphine oxides, 1-hydroxycyclohexyl phenyl ketone, 2-benzyl-2-(dimethylamino)-1-4-(4-morpholinyl)phenyl-1-butanone, alpha,alpha.-dimethoxy-alpha-phenylacetophenone, 2,2-diethoxyacetophenone, 2-methyl-1-4-(methylthio)phenyl-2-(4-morpholinyl)-1-propanone, 2-hydroxy-1-4-(hydroxyethoxy)phenyl-2-methyl-1-propanone, and combinations thereof.

A suitable nonlimiting example of a commercially available UV acrylate hotmelt adhesive that can be used in the labels of the present subject matter and which can withstand a temperature of up to 450° C. for a time period of up to 30 minutes is S 3100 available from Avery Dennison.

The silicone adhesives generally comprise silicone gum and silicone resin. In practice, additional amounts of silicone resin can be added to adjust the desired properties of the adhesive. Since gum and resin can be formulated in one phase to the desired ratio or even adhesives and resins of different nature can be combined, this fraction of the adhesive can be one component or more components.

In certain embodiments, polydimethylsiloxane gum and resin with vinyl and hydride functionality are used. In particular embodiments, a methyl based silicone adhesive is used. Such silicone adhesives are available commercially. A preferred material for the silicone adhesive, e.g. polydimethylsiloxane gum and resin with vinyl and hydride functionality, is a polydimethylsiloxane gum and resin having vinyl and hydride functionality with a solids content of about 55% to 58%. It will be appreciated that the present subject matter is not limited to that particular component for use in the silicone adhesives. Also it should be noted that silicone adhesives can be marketed with a broad range of gum to resin ratio and also the solids content can be varied in a broad range.

A wide array of crosslinkers can be used in the silicone adhesives. When using the noted polydimethylsiloxane gum/resin and silicone resin, in certain embodiments a crosslinker is a reactive siloxane polymer. It will be understood that the present subject matter can utilize other comparable crosslinkers.

A wide range of catalysts can be used in the silicone adhesives. In certain embodiments, the catalyst contains an organoplatinum compound and one or more siloxane materials. A representative catalyst contains an organoplatinum compound, tetramethyldivinyldisiloxane, and dimethyl siloxane, which is dimethylvinyl-terminated. In certain versions, the organoplatinum compound is a diethylenyl tetramethyl disiloxane platinum complex. It will be appreciated that the present subject matter can utilize other comparable catalysts, useful in catalyzing addition reactions.

The silicone adhesives may also optionally comprise an inhibitor. Examples of such inhibitors include an acetylenic, maleate or other known hydrosilation catalyst inhibitors included in the composition to extend the pot-life of the composition. Such inhibitors are described in the patent literature, such as in U.S. Pat. No. 5,576,110. In many cases an inhibitor is included in commercially available silicone adhesives.

The various silicone adhesives may utilize one or more silicone components in addition to, or instead of, (i) the noted polydimethylsiloxane gum and resin, and (ii) the noted silicone resin components.

The adhesive layer(s) and/or region(s) typically have a thickness within a range of from 10 microns to 50 microns. However, it will be understood that the present subject matter includes coating thicknesses greater than or less than these values.

Optional Release Liners

In general, useful release liners include polyethylene coated papers with a commercial silicone release coating, polyethylene coated polyethylene terephthalate films with a commercial silicone release coating, or cast polypropylene films that can be embossed with a pattern or patterns while making such films, and thereafter coated with a commercial silicone release coating. In certain embodiments, a release liner is kraft paper which has a coating of low density polyethylene on the front side with a silicone release coating and a coating of high density polyethylene on the back side. Other release liners known in the art are also suitable as long as they are selected for their release characteristics relative to the pressure sensitive adhesive chosen for use in the present subject matter.

Optional Top Coats

The composition of the top coat can vary to convenience, and any suitable heat resistant, crosslinkable, film-forming, solvent-soluble resin may be employed as the top coat. The top coat may comprise one or more layers of different materials. In many embodiments, the top coat can include one or more acrylate materials and/or various polyurethane materials. Various top coats are commercially available such as an acrylic acid/methacrylic acid based coatings. Phenoxy resins are well known in the art and are also referred to as poly(bisphenol A-co epichlorohydrin). Since poly(bisphenol A-co epichlorohydrin) contains pendant hydroxyl groups, they are crosslinkable by any of various materials, e.g., melamines, isocyanates, phenolics, urea-formaldehydes and the like, which are reactive with hydroxyl groups in the presence of a catalyst such as dibutyl tin dilaurate. The phenoxy resins described in U.S. Pat. Nos. 6,261,730, 4,578,312 and 4,526,912 are representative. Typically, the phenoxy resin is crosslinked with an isocyanate or melamine crosslinker. Crosslinking is typically effected by homogeneously mixing the crosslinker and the catalyst with the phenoxy resin, coating the mixture onto one facial surface of the film, and then exposing the coated film to crosslinking conditions, e.g., heat, radiation, etc.

Methods

The present subject matter provides methods of providing identifying indicia or other designations on a component or surface that is either at an elevated temperature, will reach such temperature, and/or might reach such temperature. Typical elevated temperatures are up to about 1,000° C., however, in certain applications, the present methods are applicable with regard to temperatures above 1,000° C.

In certain embodiments, the methods comprise providing a label assembly as described herein, and printing or otherwise depositing an ink or other marking material on the heat resistant coating of the label. The printed label is then applied to the component or surface of interest, and typically by adhering the label thereto. It will be understood that the present subject matter includes methods in which the label is first adhered to a component or surface of interest and then ink or marking material applied to the label.

Although the labels of the present subject matter can be applied to surfaces having a temperature of up to 1,000° C. or higher, in many embodiments, the labels can be applied to surfaces having a temperature within a range of from 200° C. to 650° C., and in particular embodiments within a range of from 200° C. to 500° C.

FIG. 1 is a schematic cross section of a label assembly 10A in accordance with the present subject matter. The label assembly 10A comprises a substrate 20, a layer or region of a high temperature resistant coating 30, and an adhesive layer 40. An optional release liner 60 can be used to cover or overlay the adhesive layer 40.

Figure 2:
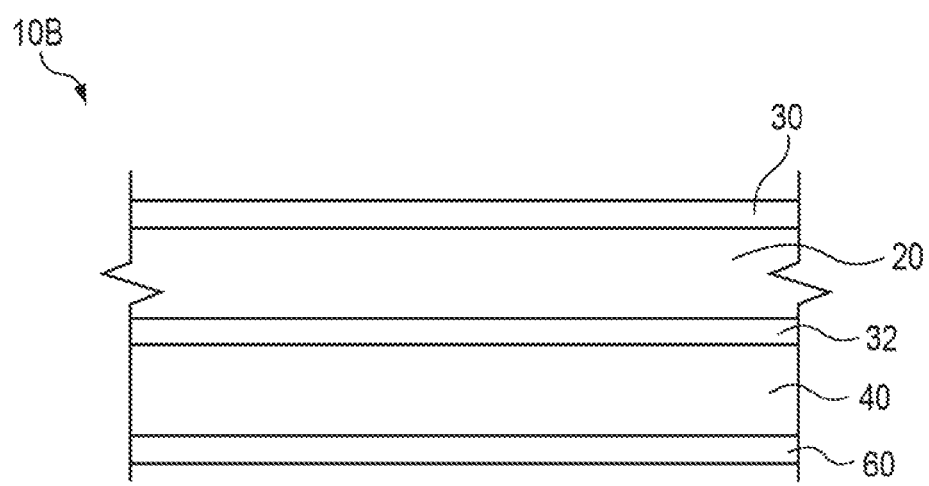
FIG. 2 is a schematic cross sectional illustration of another embodiment of a label assembly in accordance with the present subject matter.

FIG. 2 is a schematic cross section of another label assembly 10B in accordance with the present subject matter. The label assembly 10B comprises a substrate 20, a first layer or region of a high temperature resistant coating 30, a second layer or region of a high temperature resistant coating 32, and an adhesive layer 40. An optional release liner 60 can be used to cover or overlay the adhesive layer 40. The high temperature resistant coatings 30 and 32 can be the same, i.e., the same chemical composition, or they may be different from one another. Typically, the substrate 20 is disposed between the high temperature resistant coatings 30 and 32.

Figure 3:
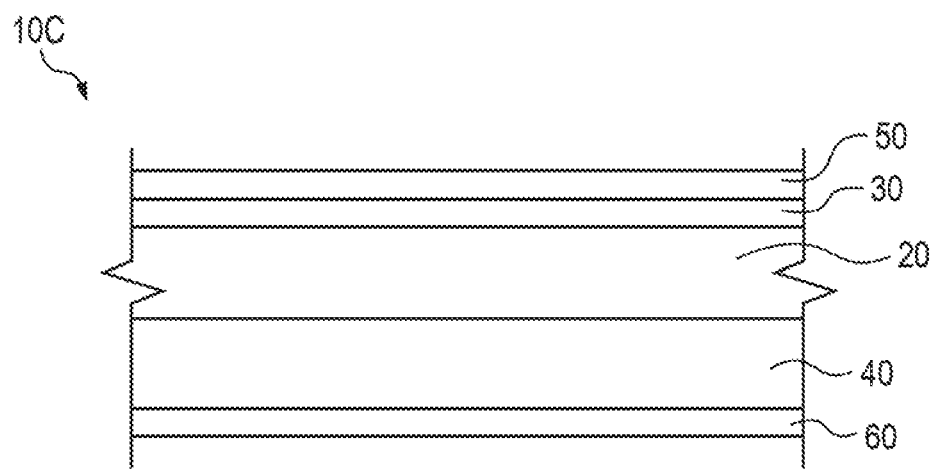
FIG. 3 is a schematic cross sectional illustration of another embodiment of a label assembly in accordance with the present subject matter.

FIG. 3 is a schematic cross section of a label assembly 10C in accordance with the present subject matter. The label assembly 10C comprises a substrate 20, a layer or region of a high temperature resistant coating 30, an adhesive layer 40, and one or more top coats 50 disposed on layer 30. An optional release liner 60 can be used to cover or overlay the adhesive layer 40.

Figure 4:
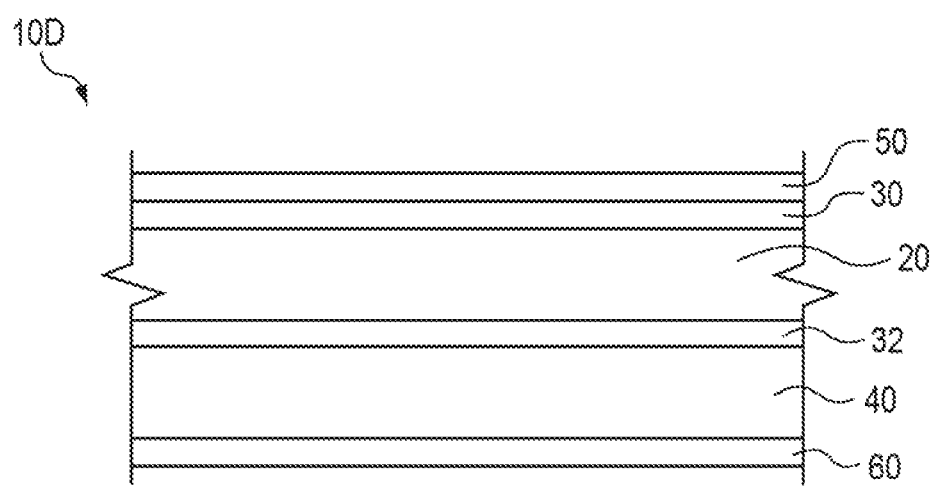
FIG. 4 is a schematic cross sectional illustration of another embodiment of a label assembly in accordance with the present subject matter.

FIG. 4 is a schematic cross section of another label assembly 10D in accordance with the present subject matter. The label assembly 10D comprises a substrate 20, a first layer or region of a high temperature resistant coating 30, a second layer or region of a high temperature resistant coating 32, an adhesive layer 40, and one or more top coats 50 disposed on the layer 30. An optional release liner 60 can be used to cover or overlay the adhesive layer 40. The high temperature resistant coatings 30 and 32 can be the same, i.e., the same chemical composition, or they may be different from one another. Typically, the substrate 20 is disposed between the high temperature resistant coatings 30 and 32.

FIGS. 1-4 also depict various embodiments of tags in accordance with the present subject matter. The tags generally comprise a substrate 20 having one or more layers or regions of high temperature resistant coatings such as 30 and/or 32, and optionally one or more top coats 50.

In a particular embodiment, the present subject matter provides a polyimide film substrate having a thickness of 150 microns, and a coating on both faces of the film. The coating thickness is within a range of from 15 microns to 20 microns on each face of the film. The coated film can resist temperatures of up to 500° C. for relatively long time periods.

In another embodiment, the present subject matter provides a substrate having a 150 micron thick aluminum layer and a 50 micron thick stainless steel layer. The substrate is coated on both faces with a coating having a thickness of 15 microns to 20 microns.

In yet another embodiment, the present subject matter provides a pressure sensitive label having a substrate of one or more of a 150 micron thick polyimide film, a 60 micron thick aluminum layer, a 100 micron thick stainless steel foil, and silane or ceramic coated fiber cloth material.

In still another embodiment, a hand tag is provided having a 150 micron thick polyimide or aluminum substrate, coated on both faces with a 15 micron thick layer of a solvent based, heat resistant pigmented siloxane coating.

In another embodiment, a label is provided having a substrate of aluminum, stainless steel, and/or polyimide, a first face coated with a solvent based, heat resistant pigmented siloxane coating having a siloxane binder with $SiO_2$ and $TiO_2$ pigment, and an adhesive layer on the second face of the substrate. A paper release liner may be used to cover the adhesive layer. This label is used in temperatures from 300° C. to 500° C.

In yet another embodiment, a label is provided having a substrate of aluminum, stainless steel, or glass fibers. The substrate has its first face coated with a water based, heat resistant pigmented siloxane coating which includes clay and silica pigments in a silicate/phosphate binder. An adhesive is deposited on the second face of the substrate. A top coat of an acrylate and/or a polyurethane can be deposited on the noted coating. And a paper release liner can cover the otherwise exposed adhesive face. This label is used in temperatures from 500° C. to 1,000° C.

FIG. 5 is a schematic illustration showing application of the label assembly 10A' after removal of the release liner 60 to thereby provide label assembly 10A'. The label assembly 10A' is shown being applied to a surface or object 70 of interest. The adhesive layer 40 is contacted with the surface or object 70.

FIG. 6 schematically depicts the label assembly 10A' after application to the surface or object 70.

EXAMPLES

Various trials involving heating of printed samples were conducted to evaluate tags and labels of the present subject matter. The materials, commercial source, and thickness of each component are set forth below in Table 1.

TABLE 1

Materials, Commercial Sources, and Thicknesses Used in Samples

| Material | Thickness (μ, microns) |
| --- | --- |
| Aluminum foil | 50 to 150 |
| Polyimide film | 50 to 200 |
| Stainless steel foil | 50 to 100 |
| Adhesive S 3100 from Avery Dennison | 10 to 70 |
| Adhesive S 8092 from Avery Dennison | 10 to 70 |
| Solvent based, heat resistant pigmented siloxane coating | 10 to 20 |
| Water based, heat resistant pigmented siloxane coating | 10 to 20 |
| Print receptive Top Coat from Avery Dennison | 0.5 to 2 |
| Print receptive Top Coat | 10 to 20 |

Various samples were prepared using the materials listed in Table 1. Samples 1-5 were prepared as follows.

Sample No. 1: A polyimide 150μ film was coated on both sides with a 15μ layer of the noted solvent based coating by roll/gravure coating at a speed of 150 to 200 m. The coated substrate was then printed using a thermal transfer ribbon.

Sample No. 2: An Al 150μ foil was coated on both sides with a 15μ layer of the noted solvent based coating by gravure coating at a speed of 150 to 200 m. The coated substrate was then printed using a thermal transfer ribbon.

Sample No. 3: An Al 60μ foil was coated on one side with a 15μ layer of the noted solvent based coating and then laminated with S3100 and a paper liner backing. The adhesive thickness was maintained at 30 gsm. These laminated specimens were then printed with thermal transfer ribbons.

Sample No. 4: An Al 60μ foil was coated on one side with a 15μ layer of the noted solvent based coating and then laminated with S8092 and a paper liner backing. The adhesive thickness was maintained at 30 gsm. These laminated specimens were then printed with thermal transfer ribbons.

Sample No. 5: An Al 60μ foil was coated on one side with a 15μ layer of the noted water based coating and then laminated with S 3100 and a paper liner backing. The adhesive thickness was maintained at 30 gsm. These laminated specimens were then printed with thermal transfer ribbons.

Evaluation was then performed after printing and lamination of Samples 1-5. The average characteristics of the samples prior to heating are set forth in Table 2.

TABLE 2

Average Characteristics of Samples 1-5 Prior to Heating

| Parameter | Standard/Instrument | Value |
| --- | --- | --- |
| Top Coat Thickness | Thickness gauge | 15μ +/− 2μ |
| Top Coat Anchorage | 3M 810 tape | No transfer of coatings on the tape |
| Cross Hatch Test | D 3359 | <10% |
| Adhesive Coating | Solvent removal | 30 gsm +/− 0.5 gsm |
| TT Printing | ANSI scale | Grade A, B, and C |

Top coat thickness was measured using a conventional thickness gauge used in the art.

Top coat Anchorage evaluation was performed in accordance with D 3359-08 using 3M 810 tape.

The Cross Hatch test was performed in accordance with D 3359.

Evaluation of the adhesive coating was performed by assessing solvent removal. A Solvent Resistance Rub Test was performed using a crockmeter as known in the art, and using E 472 Renault standard.

Evaluation of Thermal Transfer (TT) Printing was performed by using a TT printer and then scanning the print result using a REA ScanCheck instrument.

After evaluating and measuring these various characteristics of Samples 1-5, the samples were then subjected to elevated temperatures for particular time periods.

The samples were exposed at three different temperatures of 300°, 400°, and 500° C. for 15 and 30 minutes.

The samples were applied on preheated cold rolled steel (CRS). The CRS was preheated at 300°, 400°, 500° for 10 minutes. The samples were applied at these respective temperatures and then further exposed to corresponding temperatures for 15 and 30 minutes.

After heating for the noted time periods, evaluation was then performed upon Samples 1-5. The average characteristics of the samples after heating are set forth below in Table 3.

TABLE 3

Average Characteristics of Samples 1-5 After Heating

| Parameter | Standard/Instrument | Value |
| --- | --- | --- |
| TT Printing Anchorage | 3M 810 tape | <5% failure |
| Barcode Scanning | ANSI | A, B, C grade |
| Solvent Resistant Rub Test IPA, Heptanes and MEK | 100 time rub | No loss of ink |
| Scratch Resistance of the Coating | Cross hatch (D 3359) | <10% |
| Adhesive Pill | Manually | Should not be too easy to remove |

The TT Printing Anchorage test was performed as previously described for the top coat anchorage test noted in Table 2.

The Barcode Scanning evaluation was performed as previously described for the TT Printing in Table 2.

The Solvent Resistance Rub Test was performed as previously described for the Adhesive Coating test in Table 2. The solvents used were methyl ethyl ketone (MEK), heptane, and isopropyl alcohol (IPA).

The Scratch Resistance test was performed as previously described for the Cross Hatch test in Table 2.

The Adhesive Pill evaluation was performed in accordance with Finat Standard Method FTM2.

Table 4 presents the characteristics and testing results for each of Samples 1-5.

TABLE 4

Characteristics and Testing Results for Samples 1-5

| Sample No. | Coating Discoloration | Coating Anchorage | TT Print Anchorage & Appearance | Barcode Scanning | Adhesive Tack | MEK & Heptane Rub Resistance |
|---|---|---|---|---|---|---|
| 1 | Slight grey | >90% | Good | B | Good | Good |
| 2 | Slight grey | Good | Good | B | Good | Good |
| 3 | Slight grey | Good | Good | B | Good | Good |
| 4 | Slight grey | Good | Good | B | Good | Good |
| 5 | Slight grey | Good | OK | Not ok | Good | N/A |

In another trial, a printable coating in accordance with the present subject matter was prepared and evaluated. The topcoat utilized the formulation as set forth below in Table 5.

TABLE 5

Representative Coating

| Material | Amount Wt % |
|---|---|
| Methyl phenyl siloxane dispersion in water | 50-70 |
| Titanium dioxide | 10-50 |
| Water | Balance |
| Wetting and dispersing additive | 0-10 |
| Mica powder | 0-15 |
| Hydrophilic fumed silica | 0-2 |

The coating of Table 5 was applied to aluminum foil with a thickness in a range of approximately 60 to 150 microns. The coating was then dried at 180° C. The resulting coating was white in appearance and exhibited characteristics enabling the coating to be printed upon using a thermal transfer printer, i.e., an Avery 6406 corner edge, with a wax resin ribbon. The printed material exhibited excellent readability.

The coated foil have print thereon was then heated to 550° C. The legibility of the print remained excellent. The print was resistant to rubbing and resistant to wiping with a variety of solvents including ethyl acetate, methyl ethyl ketone (MEK), acetone, and isopropyl alcohol (IPA).

Another embodiment includes a crosslinker added to the formulation set forth in Table 5, at a weight percent within a range of from 0.5% to 1.5% (weight ratio based upon total weight of solids). A representative crosslinker is an aqueous titanium chelate crosslinker. Formulations using such crosslinkers can exhibit increased adhesion to aluminum substrates at temperatures of 120° C.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A printable tag for high temperature applications, the tag comprising:
a coated substrate defining at least one print receptive face, the coated substrate having a high temperature printable coating that constitutes the print receptive face, wherein the coating comprises pigment dispersed in a binder comprising silicate/phosphate, and wherein the coating does not comprise a siloxane binder.

2. The tag of claim 1 wherein the substrate includes at least one material selected from the group consisting of polymeric materials, metal materials, coated cloth materials, and composites thereof.

3. The tag of claim 2 wherein the substrate includes at least one polymeric material.

4. The tag of claim 3 wherein the polymeric material is polyimide.

5. The tag of claim 2 wherein the substrate includes at least one metal material.

6. The tag of claim 5 wherein the metal material is selected from the group consisting of aluminum, aluminum alloy, stainless steel alloy, and combinations thereof.

7. The tag of claim 1 wherein the substrate has a single substrate layer.

8. The tag of claim 1 wherein the substrate is a multilayer substrate.

9. The tag of claim 8 wherein the multilayer substrate has a total number of substrate layers of from 2 to 4.

10. The tag of claim 1 wherein the coating exhibits a heat resistance at a temperature within a range of from 500° C. to 1,000° C.

11. A printable adhesive label for high temperature applications, the label comprising:
a substrate defining a first face and an oppositely directed second face;
a pressure sensitive adhesive disposed on the second face of the substrate;
a high temperature printable coating disposed on the first face of the substrate, wherein the coating comprises pigment dispersed in binder comprising silicate/phosphate, and wherein the coating does not comrprise a siloxane binder.

12. The label of claim 11 wherein the substrate includes at least one material selected from the group consisting of polymeric materials, metal materials, coated cloth materials, and composites thereof.

13. The label of claim 12 wherein the substrate includes at least one polymeric material.

14. The label of claim 13 wherein the polymeric material is polyimide.

15. The label of any claim 12 wherein the substrate includes at least one metal material.

16. The label of claim 15 wherein the metal material is selected from the group consisting of aluminum, aluminum alloy, stainless steel alloy, and combinations thereof.

17. The label of claim 11 wherein the substrate has a single substrate layer.

18. The label of claim 11 wherein the substrate is a multilayer substrate.

19. The label of claim 18 wherein the multilayer substrate has a total number of substrate layers of from 2 to 4.

20. The label of claim 11 wherein the coating exhibits a heat resistance at a temperature within a range of from 500° C. to 1,000° C.

21. A method of labeling a surface having a temperature within a range of from 500° C. to 1,000° C., the method comprising:
   providing a label including (i) a substrate defining a first face and an oppositely directed second face, (ii) a pressure sensitive adhesive disposed on the second face of the substrate, and (iii) a high temperature printable coating disposed on the first face of the substrate, wherein the coating comprises pigment dispersed in a binder comprising silicate/phosphate, and wherein the coating does not comprise a siloxane binder; and
   applying the label to a surface having a temperature within a range of from 500° C. to 1,000° C.

22. The method of claim 21 wherein the applying is performed by contacting the pressure sensitive adhesive of the label to the surface.

23. The method of claim 21 wherein the substrate includes at least one material selected from the group consisting of polymeric materials, metal materials, coated cloth materials, and composites thereof.

24. The method of claim 23 wherein the substrate includes at least one polymeric material.

25. The method of claim 24 wherein the polymeric material is polyimide.

26. The method of claim 23 wherein the substrate includes at least one metal material.

27. The method of claim 26 wherein the metal material is selected from the group consisting of aluminum, aluminum alloy, stainless steel alloy, and combinations thereof.

28. The method of claim 21 wherein the substrate has a single substrate layer.

29. The method of claim 21 wherein the substrate is a multilayer substrate.

30. The method of claim 29 wherein the multilayer substrate has a total number of substrate layers of from 2 to 4.

31. The method of claim 21 wherein the coating exhibits a heat resistance at a temperature within a range of from 500° C. to 1,000° C.

32. A method of providing identification of a component subjected to a temperature up to 1,000° C., the method comprising:
   providing an adhesive label including (i) a substrate defining a first face and an oppositely directed second face, (ii) a pressure sensitive adhesive disposed on the second face of the substrate, and (iii) a high temperature printable coating disposed on the first face of the substrate, wherein the coating comprises pigment dispersed in a binder comprising silicate/phosphate, and wherein the coating does not comprise a siloxane binder;
   printing identification indicia on the coating; and
   contacting the pressure sensitive adhesive with the component.

* * * * *